3,598,825
Patented Aug. 10, 1971

3,598,825
2(4 PHENYL PIPERAZINO METHYL) 3 QUINUCLIDINONES

John H. Biel and Harvey B. Hopps, Milwaukee, Wis., assignors to Aldrich Chemical Company, Inc., Milwaukee, Wis.
No Drawing. Filed Dec. 13, 1967, Ser. No. 690,087
Int. Cl. C07d 51/70
U.S. Cl. 260—268       6 Claims

ABSTRACT OF THE DISCLOSURE

2 - [N' - (o - (lower)alkoxyphenyl)piperazinomethyl]-3-quinuclidinone and the pharmaceutically acceptable nontoxic salts thereof are useful as tranquilizers and central nervous system depressants in mammals.

BACKGROUND OF THE INVENTION (1) Field of the invention

This invention relates to novel compounds. More particularly, this invention relates to novel compounds which possess valuable therapeutic utility as tranquilizers and central nervous system depressants in mammals and to methods for the preparation thereof. In another aspect, this invention relates to a novel method of tranquilizing mammals and depressing the central nervous system of mammals.

(2) Description of the prior art

There exists a need to provide additional agents useful as tranquilizers and central nervous system depressants. Thus it is an object of this invention to provide a new class of compounds having tranquilizing activity and central nervous system depressant activity. It is another object of the present invention to provide a novel method of tranquilizing mammals and depressing the central nervous system of mammals.

SUMMARY OF THE INVENTION

The above and other objects which may appear as the specification proceeds are achieved by this invention which comprises the provision of compounds selected from the group consisting of compounds having the formula I 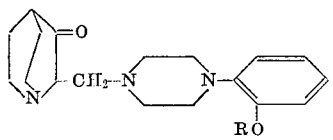

wherein R is (lower)alkyl, and the pharmaceutically acceptable nontoxic salts thereof.

The quinuclidinone moiety (a) of the compounds described herein is represented throughout this specification as (b).

(a) 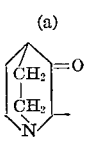   (b) 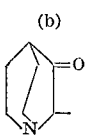

The pharmaceutically acceptable nontoxic salts include the organic and inorganic acid addition salts, e.g., those prepared from acids such as hydrochloric, sulfuric, sulfamic, tartaric, fumaric, hydrobromic, hydriodic, glycolic, citric, maleic, phosphoric, succinic, acetic, nitric and the like. Such salts are prepared by conventional methods.

The term "(lower)alkyl" as used herein means both straight and branched chain alkyl radicals containing from 1 to 8 carbon atoms, e.g. methyl, ethyl, propyl, isopropyl, butyl, isobutyl, t-butyl, amyl, hexyl, 2-ethylhexyl, etc.

A preferred embodiment of the present invention consists of the compound of the formula II 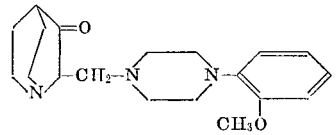

and the nontoxic salts thereof.

The compounds of this invention can be prepared by reacting an N-(o-(lower)alkoxyphenyl)piperazine of the formula III 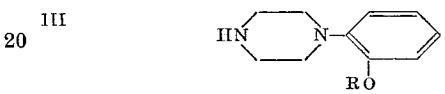

with 2-methylene-3-quinuclidinone

IV 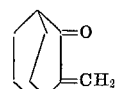

in a suitable solvent medium, such as methanol, ethanol, dimethylformamide, benzene, dimethylsulfoxide and the like, at room or elevated temperatures, e.g. 20 to 100° C.

2-methylene-3-quinuclidinone is prepared via the following series of reactions:

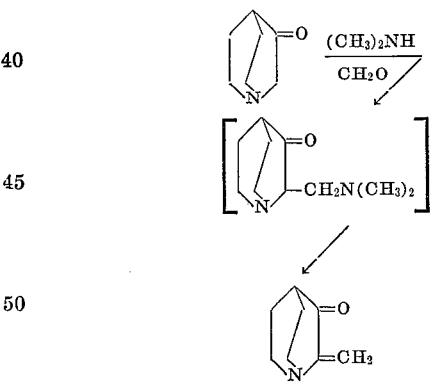

3-quinuclidinone is reacted with dimethylamine and formaldehyde, and upon heating, e.g., at reflux temperature, the intermediate Mannich base undergoes spontaneous deamination to produce 2-methylene-3-quinuclidinone.

The compounds of this invention possess tranquilizing activity and central nervous system depressant activity making them useful as tranquilizers and central nervous system depressants in mammals.

The tranquilizing activity of the compounds of this invention is evaluated by the standard condition response test. When for example 2-[N'-(o-methoxyphenyl)piperazinomethyl]-3-quinuclidinone trihydrochloride was administered to the rat p.o. the avoidance $ED_{50}$ was 20 mg./kg. and the escape $ED_{50}$ was 80 mg./kg.

The central nervous system depressant activity of the compounds of the present invention is evaluated by the behavioral depression and reflux depression tests. In the behavioral depression test, treated animals are observed in an undisturbed condition for signs of behavioral depression and are checked for their reaction to selected auditory, nociceptive and tactile stimuli. At the same time, a subjective evaluation of spontaneous motor activity is made. In the reflex depression test, the presence or absence of the righting, pinna and corneal reflexes are elicited by a fine wire, while the righting reflex is considered to be depressed if the animal, when placed on its back, does not right itself within 30 minutes. When, for example, the preferred compound of the present invention, 2-[N'-(o-methoxyphenyl)piperazinomethyl] - 3 - quinuclidinone trihydrochloride was tested, it exhibited central nervous system depressant activity at doses as low as 150–300 mg./kg. p.o. in the mouse, 10 mg./kg. p.o. in the rat, 20 mg./kg. p.o. in the cat, 10–20 mg./kg. p.o in the dog and 5 mg/kg. p.o. in the monkey. The compound also exhibited an $LD_{50}$ of 850 mg./kg. in the mouse and 337 mg./kg. in the rat.

The compounds of this invention may be administered as the free bases or in the form of their nontoxic addition salts. They may be compounded and formulated into pharmaceutical preparations in unit dosage form for oral or parenteral administration with organic or inorganic solid materials or liquids which are pharmaceutically acceptable carriers. The compositions may take the form of tablets, powder, granules, capsules, suspensions, solutions and the like. Such compositions are considered within the scope of this invention.

The compounds of this invention when administered orally or parenterally in an effective amount are effective in tranquilizing mammals and depressing the central nervous system of mammals. A dosage range of about 5 to about 150 milligrams per kilogram per day is convenient. Administration of the compounds is conveniently begun at the minimum effective dose or $ED_{50}$ of the particular compound in the particular species of mammal. However, in general, the particular dosage most suitable for a particular application, as might be expected, will vary with age, weight and general health of the mammal under treatment and the degree of tranquility or central nervous system depression required. After taking into consideration these factors and any other factors to be considered, one skilled in the art of treating diseases of mammals can readily determine the appropriate dosage.

The following examples are intended to illustrate the invention described herein without unduly restricting it.

EXAMPLE 1

Preparation of 2-methylene-3-quinuclidinone

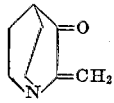

A solution of 3-quinuclidinone (50 gm., 0.4 mol), 37% aqueous formaldehyde (50 gm., 0.6 mol), 40% aqueous dimethylamine (68 gm., 0.6 mol.), and absolute ethanol (70 ml.) was heated at reflux for 22 hours. The solution was concentrated at reduced pressure to a residue which was distilled at reduced pressure. The fraction boiling at 90–110°/10 mm., 2-methylene-3-quinuclidinone was recovered and weighed 43 gm.

EXAMPLE 2

Preparation of 2-[N'-(o-methoxyphenyl)piperazinomethyl]-3-quinuclidinone trihydrochloride

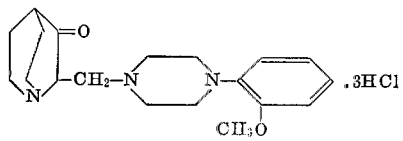

A mixture of 2-methylene-3-quinuclidinone (4.5 g., 0.032 mol) and N-(o-methoxyphenyl)piperazine (6.1 g., 0.032 mol) in 50 ml. of methanol was allowed to stand at room temperature for 60 hrs. The solvent was then removed under vacuum and the free base was recrystallized from isopropanol to yield 6.7 g. (63%) of 2-[N'-(o-methoxyphenyl)piperazinomethyl]-3-quinuclidinone M.P. 108.5–109.5° C. The base was treated with hydrogen chloride to produce 2-[N'-(o-methoxyphenyl)piperazinomethyl]-3-quinuclidinone trihydrochloride; M.P. ca. 80° C. dec.

EXAMPLE 3

When in the procedure of Example 2, N-(o-methoxyphenyl)piperazine is replaced by an equal molar amount of N-(o-ethoxyphenyl)piperazine
N-(o-propoxyphenyl)piperazine
N-(o-isopropoxyphenyl)piperazine
N-(o-butoxyphenyl)piperazine
N-(o-t-butoxyphenyl)piperazine and N-(o-pentoxyphenyl)piperazine there are obtained 2-[N'-(o-ethoxyphenyl)piperazinomethyl]-3-quinuclidinone
2-[N'-(o-propoxyphenyl)piperazinomethyl]-3-quinuclidinone
2-[N'-(o-isopropoxyphenyl)piperazinomethyl]-3-quinuclidinone
2-[N'-(o-butoxyphenyl)piperazinomethyl]-3-quinuclidinone
2-[N'-(o-t-butoxyphenyl)piperazinomethyl]-3-quinuclidinone and
2-[N'-(o-pentoxyphenyl)piperazinomethyl]-3-quinuclidinone respectively.

While in the foregoing specification various embodiments of this invention have been set forth in specific detail and elaborated for the purpose of illustration, it will be apparent to those skilled in the art that this invention is susceptible to other embodiments and that many of the details can be varied widely without departing from the basic concept and the spirit and scope of the invention.

We claim:

1. A compound selected from the group consisting of compounds of the formula

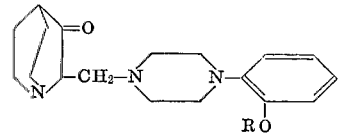

wherein

R is (lower)alkyl and the pharmaceutically acceptable nontoxic salts thereof.

2. The compound of claim 1 having the formula

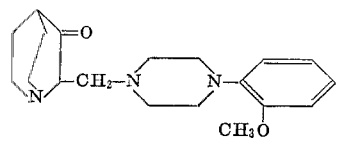

3. A pharmaceutically acceptable nontoxic salt of the compound of claim 2.

4. The compound of claim 1 having the formula

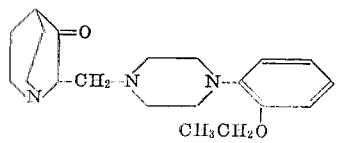

5. The compound of claim 1 having the formula
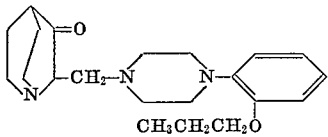
6. The compound of claim 1 having the formula
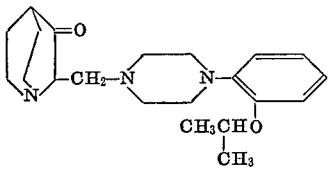
References Cited
UNITED STATES PATENTS
| | | | |
|---|---|---|---|
| 2,834,779 | 5/1958 | Biel et al. | 260—268X |
| 3,146,235 | 8/1964 | Nichols | 260—268 |
| 3,153,039 | 10/1964 | Krieger et al. | 260—268X |
| 3,384,641 | 5/1968 | Biel et al. | 260—294.7 |
| 3,462,442 | 8/1969 | Biel et al. | 260—294.7X |
DONALD G. DAUS, Primary Examiner
U.S. Cl. X.R.
260—294.7; 424—250